United States Patent
Kreider et al.

(10) Patent No.: US 10,353,681 B2
(45) Date of Patent: Jul. 16, 2019

(54) SYSTEMS AND METHODS FOR USING ERROR CORRECTION AND PIPELINING TECHNIQUES FOR AN ACCESS TRIGGERED COMPUTER ARCHITECTURE

(71) Applicant: HONEYWELL INTERNATIONAL INC., Morris Plains, NJ (US)

(72) Inventors: Thom Kreider, Peoria, AZ (US); Jon Douglas Gilreath, Peoria, AZ (US); Gary Warnica, Phoenix, AZ (US); Paul D. Kammann, Plymouth, MN (US); Vince J. Gavagan, IV, Peoria, AZ (US); Ronald E. Strong, Phoenix, AZ (US)

(73) Assignee: HONEYWELL INTERNATIONAL INC., Morris Plains, IL (US)

( * ) Notice: Subject to any disclaimer, the term of this patent is extended or adjusted under 35 U.S.C. 154(b) by 0 days.

(21) Appl. No.: 15/688,063

(22) Filed: Aug. 28, 2017

(65) Prior Publication Data
US 2017/0364340 A1    Dec. 21, 2017

Related U.S. Application Data

(63) Continuation-in-part of application No. 14/282,912, filed on May 20, 2014, now Pat. No. 9,747,197.

(51) Int. Cl.
*G06F 9/312*    (2018.01)
*G06F 9/445*    (2018.01)
(Continued)

(52) U.S. Cl.
CPC ............ *G06F 8/4452* (2013.01); *G06F 8/441* (2013.01); *G06F 9/3004* (2013.01);
(Continued)

(58) Field of Classification Search
CPC .. G06F 9/4494; G06F 9/3001; G06F 9/30043; G06F 9/30079; G06F 9/3867;
(Continued)

(56) References Cited

U.S. PATENT DOCUMENTS 5,184,347 A    2/1993  Farwell et al.
5,369,766 A   11/1994  Nakano
(Continued)

FOREIGN PATENT DOCUMENTS

EP       2947566 A1    11/2015
WO   2006116540 A2    11/2006

OTHER PUBLICATIONS

EP Examination Report for Application No. EP 15165820.0 dated Jul. 10, 2015.
(Continued)

*Primary Examiner* — Daniel H Pan
(74) *Attorney, Agent, or Firm* — Lorenz & Kopf, LLP

(57) ABSTRACT

A method for improving performance of an access triggered architecture for a computer implemented application is provided. The method first executes typical operations of the access triggered architecture according to an execution time, wherein the typical operations comprise: obtaining a dataset and an instruction set; and using the instruction set to transmit the dataset to a functional block associated with an operation, wherein the functional block performs the operation using the dataset to generate a revised dataset. The method further creates a pipeline of the typical operations to reduce the execution time of the typical operations, to create a reduced execution time; and executes the typical operations according to the reduced execution time, using the pipeline.

18 Claims, 19 Drawing Sheets

(51) Int. Cl.
  *G06F 9/50*     (2006.01)
  *G06F 11/10*    (2006.01)
  *G06F 15/82*    (2006.01)
  *G06F 9/38*     (2018.01)
  *G06F 8/41*     (2018.01)
  *G06F 9/30*     (2018.01)
  *G06F 9/54*     (2006.01)
  *G06F 9/448*    (2018.01)
  *H04L 1/00*     (2006.01)

(52) U.S. Cl.
  CPC ............ *G06F 9/30079* (2013.01); *G06F 9/38* (2013.01); *G06F 9/3867* (2013.01); *G06F 9/4494* (2018.02); *G06F 9/544* (2013.01); *G06F 9/547* (2013.01); *G06F 9/3001* (2013.01); *G06F 9/30043* (2013.01); *G06F 9/5038* (2013.01); *G06F 11/1044* (2013.01); *G06F 15/82* (2013.01); *H04L 1/0045* (2013.01); *H04L 1/0047* (2013.01)

(58) Field of Classification Search
  CPC ........ G06F 9/544; G06F 9/547; G06F 9/5038; G06F 8/4452; G06F 8/441; G06F 15/82; G06F 11/1044; G06F 2212/251; G06F 2212/2515; G06F 2212/6042; G06F 9/3004; H04L 1/0045; H04L 1/0057
  USPC .... 712/25–27, 201, 216–219; 714/746, 752; 717/150, 161
  See application file for complete search history.

(56) References Cited

U.S. PATENT DOCUMENTS

| | | | |
|---|---|---|---|
| 5,537,567 | A  | 7/1996  | Galbraith |
| 5,617,570 | A  | 4/1997  | Russell et al. |
| 5,623,684 | A  | 4/1997  | El-Ghoroury et al. |
| 6,408,428 | B1 | 6/2002  | Schlansker et al. |
| 7,415,689 | B2 | 8/2008  | Taylor |
| 7,669,041 | B2 | 2/2010  | Khailany |
| 7,694,084 | B2 | 4/2010  | Raghavan et al. |
| 7,823,091 | B2 | 10/2010 | Dennison et al. |
| 8,520,812 | B2 | 8/2013  | Weissman |
| 2002/0169942 | A1* | 11/2002 | Sugimoto ............. G06F 9/3853 712/24 |
| 2008/0039070 | A1  | 2/2008  | Ptashek |
| 2008/0229145 | A1* | 9/2008  | Bose .................... G06F 11/1008 714/10 |
| 2009/0316657 | A1  | 12/2009 | Singh et al. |
| 2012/0063497 | A1  | 3/2012  | Kim et al. |
| 2012/0216012 | A1* | 8/2012  | Vorbach .................. G06F 8/443 712/11 |
| 2013/0173828 | A1  | 7/2013  | Todd et al. |
| 2017/0364340 | A1  | 12/2017 | Kreider et al. |
| 2019/0364340 |     | 12/2017 | Kreider et al. |

OTHER PUBLICATIONS

EP Examination Report for Application No. EP 15165820.0 dated Mar. 14, 2016.
EP Examination Report for Application No. EP 15165820.0 dated Dec. 13, 2016.
Tempere University of Technology; About Transport-Triggered Architectures [Retrieved by internet: http://tce.cs.tut.fi/tta.html] Jan. 28, 2014.
Heikkinen, et al.; On efficiency of transport Triggered Architectures in DSP Applications [Retrieved from internet: http://www.cs.tut.fi/~move/doc/WSEAS02.pdf] Jan. 28, 2014.
Niiranen, Miika; Transport Triggered Architectures on FPGA [Retrieved from internet: http://www.cs.tut.fi/~move/doc/TTAs_On_FPGA_v1.1.pdf] Jan. 28, 2014.
Hauser, et al.; Transport Triggered Interconnection Network for a Scalable Application-Specific Processor [Retrieved from internet: http://www.aes.tu-berlin.de/fileadmin/fg196/publication/ttn.pdf] Jan. 28, 2014.
Hoogerbrugge, et al.; Transport-Triggering vs. Operation-Triggering [Retrieved from internet: http://citeseerx.ist.psu.edu/viewdoc/download?doi=10.1.1.46.4261&rep=rep1&type=pdf]Jan. 28, 2014.
Corporaal, et al.; Using Transport Triggered Architectures for Embedded Processor Design [Retrieved from internet: http://citeseerx.ist.psu.edu/viewdoc/download?doi=10.1.1.30.1278&rep=rep1&type=pdf] Jan. 28, 2014.
Extended EP Search Report for Application No. 18190866.6 dated Mar. 4, 2019.

* cited by examiner

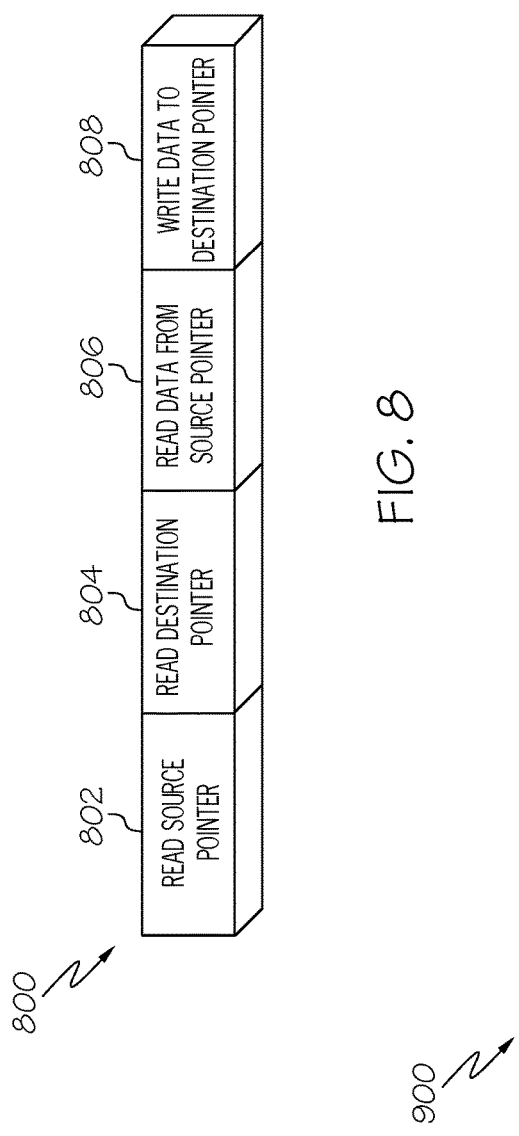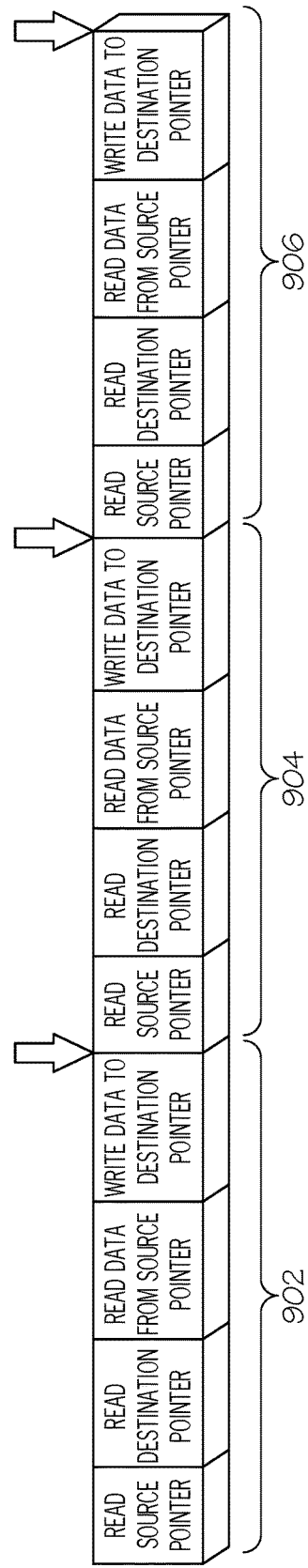

SYSTEMS AND METHODS FOR USING ERROR CORRECTION AND PIPELINING TECHNIQUES FOR AN ACCESS TRIGGERED COMPUTER ARCHITECTURE

CROSS-REFERENCE TO RELATED APPLICATION

This application is a continuation-in-part of U.S. patent application Ser. No. 14/282,912, filed May 20, 2014.

TECHNICAL FIELD

Embodiments of the subject matter described herein relate generally to computer architecture systems. More particularly, embodiments of the subject matter relate to the implementation and use of an access triggered computer architecture system.

BACKGROUND

General purpose processors experience high failure rates during execution of applications that rely on time-critical operations. As one example, when building an engine controller, there are specialized considerations based on time-critical factors. For instance, a valve is required to move at a very precise time in order to avoid collision with a piston. Here, a general purpose processor architecture would not provide the most advantageous implementation.

Accordingly, it is desirable to provide a time-conscious computing architecture and method for its use, for applications in which time is an important concern. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for improving performance of an access triggered architecture for a computer implemented application. The method executes typical operations of the access triggered architecture according to an execution time, wherein the typical operations comprise: obtaining a dataset and an instruction set; and using the instruction set to transmit the dataset to a functional block associated with an operation, wherein the functional block performs the operation using the dataset to generate a revised dataset. The method further creates a pipeline of the typical operations to reduce the execution time of the typical operations, to create a reduced execution time; and executes the typical operations according to the reduced execution time, using the pipeline.

Some embodiments of the present disclosure provide a system for improving performance of an access triggered architecture for a computer implemented application. The system includes: a system memory element comprising a plurality of system memory locations; and at least one processor communicatively coupled to the system memory element, the at least one processor configured to: execute typical operations of the access triggered architecture according to an execution time, wherein the typical operations comprise: obtaining a dataset and an instruction set; and using the instruction set to transmit the dataset to a functional block associated with an operation, wherein the functional block performs the operation using the dataset to generate a revised dataset. The at least one processor is further configured to: create a pipeline of the typical operations to reduce the execution time of the typical operations, to create a reduced execution time; and execute the typical operations according to the reduced execution time, using the pipeline.

Some embodiments of the present disclosure provide a non-transitory, computer-readable medium containing instructions thereon, which, when executed by a processor, perform a method for improving performance of an access triggered architecture for a computer implemented application. The method executes typical operations of the access triggered architecture according to an execution time, wherein the typical operations comprise: obtaining a dataset and an instruction set wherein the instruction set comprises a plurality of instructions, including a current instruction consisting of a source pointer and a destination pointer; and using the instruction set to transmit the dataset to a functional block associated with an operation, by: retrieving the dataset from a first system memory location indicated by the source pointer; relocating the dataset to a second system memory location of the functional block, wherein the second system memory location is indicated by the destination pointer, to trigger execution of the operation associated with the second memory location, based on the instruction, wherein the functional block is configured to execute the operation when triggered, and wherein the functional block is triggered each time data is received at the second system memory location; performing the operation by the functional block at the second system memory location, using the dataset, to generate a result; and returning the generated result to the second system memory location, wherein the functional block performs the operation using the dataset to generate a revised dataset comprising the generated result. The method further creates a pipeline of the typical operations to reduce the execution time of the typical operations, to create a reduced execution time; and executes the typical operations according to the reduced execution time, using the pipeline.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 8 is a diagram representation of a typical operation executed by an access triggered architecture, in accordance with the disclosed embodiments;

FIG. 9 is a diagram representation of multiple typical operations executed sequentially, in accordance with the disclosed embodiments;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for initializing and using an access triggered computer architecture. An access triggered architecture includes a plurality of functional blocks. Each functional block performs an operation using an input dataset received at an associated system memory address. In certain embodiments, a system memory address is associated with a functional block, which performs an operation using an input dataset stored at the system memory address. Generally, when a dataset is received at a particular memory address, the functional block associated with the memory address performs an arithmetic and/or logical operation using the received dataset, and then returns a result.

Also contemplated herein are techniques for performing error correction and pipelining operations for a computer-implemented access triggered architecture, such that the access triggered architecture is rendered more robust, reliable, and operates more quickly than a standard access triggered architecture configuration. Specifically, error correction techniques may prevent "bit-flipping" or other changes to the binary representations of data stored by the access triggered architecture system, thus increasing reliability of the access triggered architecture. Pipelining techniques allow the access triggered architecture to increase the speed of performing operations.

Figure 1:
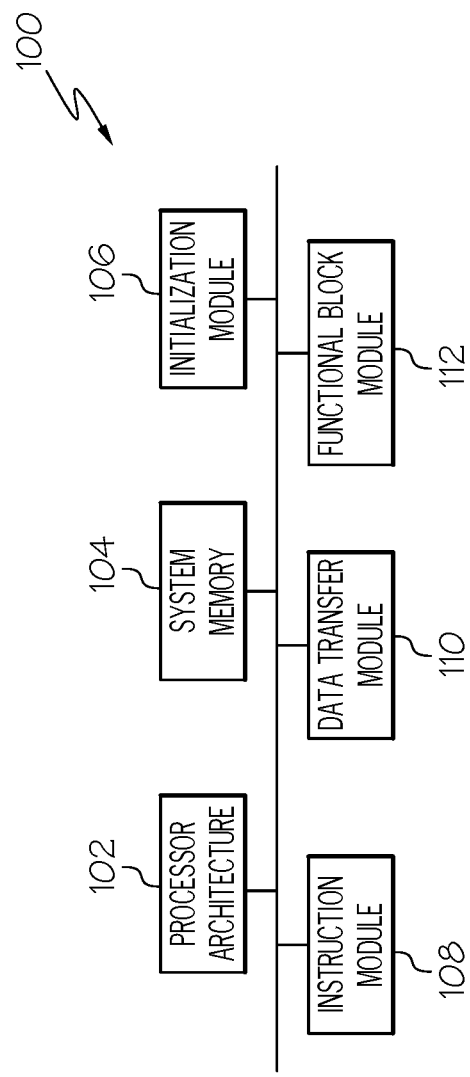
FIG. 1 is a schematic block diagram representation of an access triggered architecture system, according to some embodiments.

FIG. 1 is a schematic block diagram representation of an access triggered architecture system 100, according to some embodiments. The access triggered architecture system 100 may be implemented using any desired platform, but will generally be implemented using one or more state-machines implemented within a Field Programmable Gate Array (FPGA). For example, the access triggered architecture system 100 could be realized as any of the following, without limitation: a data multiplexor/de-multiplexor, a remote data concentrator, a bus translator (e.g., Ethernet to MIL-1553), a specialized piece of diagnostic equipment, an embedded processor-based device or system, or any other device that includes a processor architecture 102 and system memory 104. Alternatively, an access triggered architecture system 100 may be used to realize a number of implementations using any type of controller associated with embodiments, including but not limited to: network data handling, control of aircraft input and output (I/O) signals, home water heating, or the like.

The access triggered architecture system 100 may include, without limitation: a processor architecture 102; a system memory 104; an initialization module 106; an instruction module 108; a data transfer module 110; and a functional block module 112. In practice, various embodiments of the access triggered architecture system 100 may include additional or alternative elements and components, as desired for the particular application. These elements and features of the access triggered architecture system 100 may be operatively associated with one another, coupled to one another, or otherwise configured to cooperate with one another as needed to support the desired functionality—in particular, providing features specific to an access triggered architecture, as described herein. For ease of illustration and clarity, the various physical, electrical, and logical couplings and interconnections for these elements and features are not depicted in FIG. 1. Moreover, it should be appreciated that embodiments of the access triggered architecture system 100 will include other elements, modules, and features that cooperate to support the desired functionality. For simplicity, FIG. 1 only depicts certain elements that relate to the access triggered architecture features, described in more detail below.

The processor architecture 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems. Alternatively, the processor architecture 102 is not implemented using a microcontroller or processor; in this case, the access triggered architecture system 100 utilizes microcontroller and/or processor components relevant to a particular application.

The processor architecture 102 is configured to communicate with system memory 104. The system memory 104 represents any non-transitory short or long term storage or other computer-readable media capable of storing programming instructions for execution on the processor architecture 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the processor architecture 102 could receive and cooperate with external computer-readable media realized as a portable or mobile component or application platform, e.g., a portable hard drive, a USB flash drive, an optical disc, or the like.

The initialization module 106 is configured to create a plurality of functional blocks utilized in the access triggered architecture system 100. The initialization module 106 accomplishes this by associating an operation or function relevant to a particular application with a location in system memory 104 to create the functional block. During execution of the particular application, the functional block is configured to perform the same operation, consistently, each time a set of data arrives at the associated memory location.

The instruction module 108 is configured to retrieve instructions from a storage location in system memory 104, to recognize the information included in each instruction, and to initiate execution of the instructions. Generally, each instruction includes the information required to move a set of data from a location in system memory, at which the data is stored, to a new location in system memory 104. Each instruction includes two pointers: a source pointer and a destination pointer. The source pointer references a source location in system memory 104, from which a set of data will be moved when the instruction is executed. The destination pointer references a destination location in system memory 104, where the set of data will be moved. Each source location and each destination location within the system memory block 104 may be assigned to memory, I/O, or a functional block. In certain embodiments, a particular application using access triggered architecture system 100 utilizes an instruction table comprising a plurality of instructions. Each instruction table is specific to a particular application, and when the instruction table is executed, each instruction is performed sequentially. Instruction tables may be used individually or in combination with one or more additional instruction tables.

In some embodiments, the instruction module 108 is configured to perform a loop, once the end of the table has been reached, by returning to the beginning of the table and executing the sequence of instructions again. In other embodiments, the instruction module 108 is configured to execute another table, upon reaching the end of a particular instruction table. In some embodiments, the instruction module 108 is configured to execute one list of instructions only, and to cease execution once the end of the instruction list has been reached. In some embodiments, the execution of an instruction list occurs when triggered by an external event.

The data transfer module 110 is configured to receive instruction information from the instruction module 108, and to carry out the relocation of a dataset specified in each instruction. Generally, the data transfer module 110 accesses a source pointer and a destination pointer in each instruction, identifies a source location associated with the source pointer, identifies a destination location associated with the destination pointer, retrieves a set of data from the source location, and transmits the set of data to the destination location.

The functional block module 112 is suitably configured to perform an operation using a set of data received at a destination location. Each destination location is indicated by a system memory address. Generally, a functional block is associated with a destination location and, when a set of data is received at a particular destination location indicated by a particular system memory address, the functional block is triggered. Once triggered, the functional block performs a designated operation. The designated operation is consistently performed for each set of data received at the particular destination location associated with the functional block.

Operations performed by a functional block alter the received data in one or more ways. Operations may include arithmetic operations, logical operations, and/or any specialized functions applicable to a task performed by an access triggered architecture system 100. In certain embodiments, a designated operation associated with and performed by a particular functional block may include more than one basic operation. For example, a Functional Block A may be configured to increment a received set of data, while Functional Block B may be configured to increment the set of data and to perform a logical OR operation with a second set of data, to generate a result. Specialized functions may include calculation of cyclic redundant checks (CRC's), encryption/decryption steps, stripping headers from Ethernet packets, performing a search for a sequence of characters in one or more data streams, or the like. This specialization of functional blocks permits the association of a process with a designated functional block, and the creation of a reusable library of functional blocks, which optimizes efficiency of the access triggered architecture system 100.

To enable the performance of useful tasks by the access triggered architecture system 100, locations within system memory 104 are not exclusively mapped to memory devices. In some embodiments, system memory 104 locations are mapped to specialized locations used for data input and output. In some embodiments, system memory 104 locations are mapped to dedicated functions within the functional block module 112. For example, the access triggered architecture system 100 is configured to read some external information (e.g., a current air speed) from a specialized location within system memory 104. This specialized system memory 104 location may be referred to as an "in-mailbox". The access triggered architecture system 100 then stores the information to a second specialized system memory 104 location, which is associated with a functional block. For purposes of this example, the functional block is configured to perform a "compare" operation, with a received set of data. The access triggered architecture system 100 then transfers a value from system RAM memory (e.g., an air speed upper limit) into a third specialized memory location associated with the same functional block. The functional block performs the "compare" function, comparing the two data values and producing a result, which is then stored in a third specialized memory location. In certain embodiments, that result may be stored in a fourth specialized location in system memory (e.g., an "out-mailbox"), at which the result is available for retrieval by other functional blocks and/or systems within the access triggered architecture system 100. For this particular example, the comparison result between the current air speed and an air speed upper limit may be used to adjust an external setting, such as an engine throttle setting.

In practice, the initialization module 106, the instruction module 108, the data transfer module 110, and/or the functional block module 112, may be implemented with (or cooperate with) the processor architecture 102 to perform at least some of the functions and operations described in more detail herein. In this regard, the initialization module 106, the instruction module 108, the data transfer module 110, and/or the functional block module 112, may be realized as suitably written processing logic, application program code, or the like.

Figure 2:
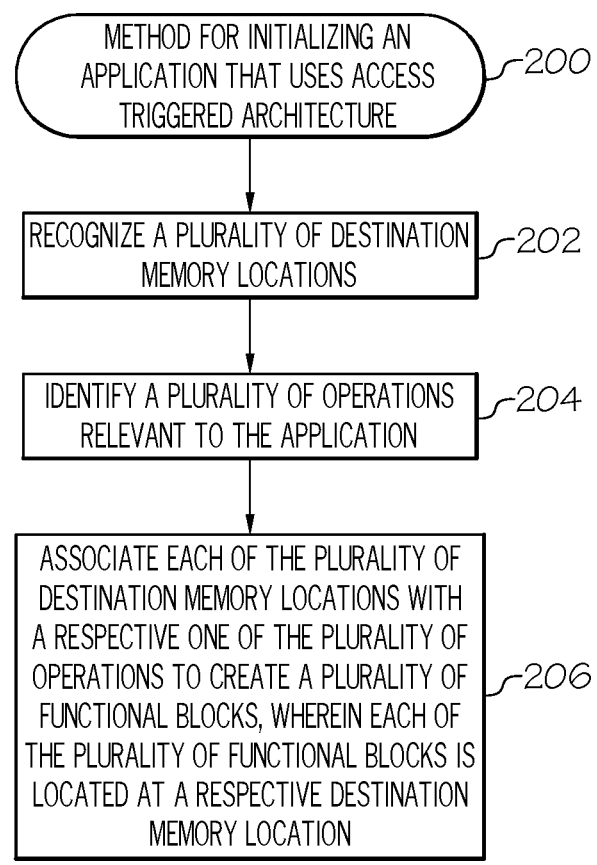
FIG. 2 is a flow chart that illustrates an embodiment of a process for initializing an application that uses access triggered architecture.

FIG. 2 is a flow chart that illustrates an embodiment of a process 200 for initializing an application that uses access triggered architecture. In certain embodiments, an application may include executable instructions enabling use of an access triggered architecture as a tool to accomplish one or more specific tasks. First, the process 200 recognizes a plurality of destination memory locations (step 202). The destination memory locations include system memory addresses to which one or more sets of data will be transferred. The plurality of destination memory locations are predefined at design time. Here, the process 200 recognizes a predefined block of storage in system memory, consisting of a plurality of system memory addresses.

Next, the process 200 identifies a plurality of operations relevant to the application (step 204). The plurality of operations may comprise any instruction that the process 200 is capable of executing, and that is distinguishable as an instruction applicable to the application. Generally, each of the plurality of operations includes an arithmetic and/or logical operation. In certain exemplary embodiments, each of the plurality of operations includes a single or one-step function. In other embodiments, each of the plurality of operations may include a combination of functions.

After recognizing applicable destination memory locations (step 202), and identifying a plurality of operations relevant to the application (step 204), the process 200 associates each of the plurality of destination memory locations with a respective one of the plurality of operations to create a plurality of functional blocks, wherein each of the plurality of functional blocks is located at a respective destination memory location (step 206). Here, the process 200 creates a connection between one of the identified, relevant operations to a destination memory location, resulting in a functional block. Each functional block performs an associated operation when a set of data is received at the destination memory location. Here, a group of functional blocks are created by associating a group of operations with a group of memory locations. Although each functional block generally performs just one task, these functional blocks may be used in combination with one another to perform more complex tasking.

Figure 3:
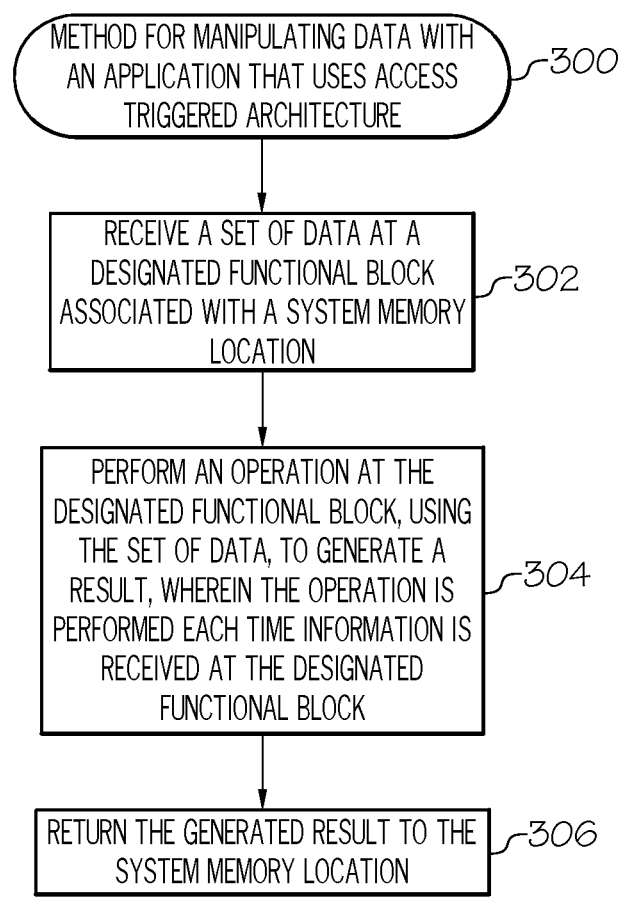
FIG. 3 is a flow chart that illustrates an embodiment of a process for manipulating data with an application that uses an access triggered architecture.

FIG. 3 is a flow chart that illustrates an embodiment of a process 300 for manipulating data with an application that uses an access triggered architecture. First, the process 300 receives a set of data at a designated functional block associated with a system memory location (step 302). In one implementation, an access triggered architecture may be utilized by an aircraft, and in this example, the set of data may include position information for aircraft control surfaces (flaps, elevators, etc), engine temperatures, airspeeds, fuel weight, global positioning system (GPS) information, engine performance parameters, automatic flight control parameters, or the like.

Figure 4:
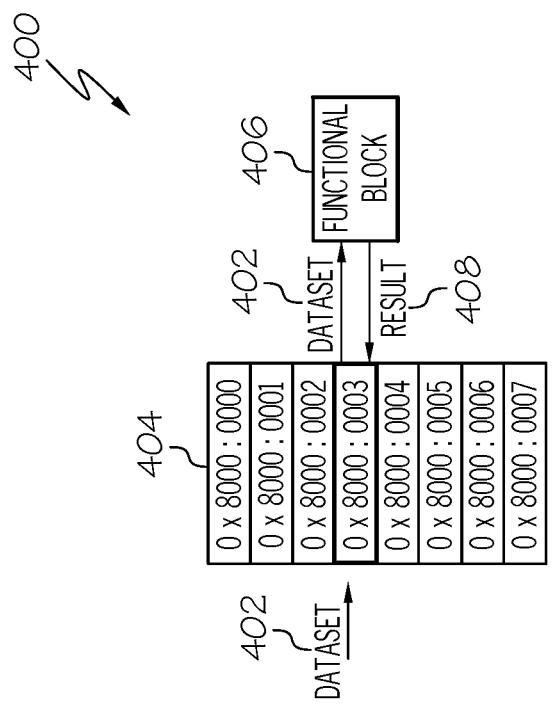
FIG. 4 is a diagram representation of a subset of system memory, configured to access a functional block comprising a single operation, according to some embodiments.

Next, the process 300 performs an operation at the designated functional block, using the set of data, to generate a result, wherein the operation is consistently performed each time information is received at the designated functional block (step 304). In certain embodiments, the operation may include a single function, as illustrated in FIG. 4. FIG. 4 is a diagram representation of an access triggered architecture system 400, including a subset of system memory 404, configured to access a functional block 406 comprising a single operation, according to some embodiments. As shown, a dataset 402 is received at memory location 0x8000:0003, which is associated with a functional block 406. The functional block 406 executes a single function, or one-step operation, using the received dataset 402. Exemplary embodiments of single operations may include, without limitation: arithmetic operations (e.g., increment, decrement, etc.), logical operations (e.g., AND, OR, XOR, etc.), or the like. Once the single function is performed, the functional block 406 returns a result 408 to the same memory location. Thus, the original dataset 402 transmitted to memory location 0x8000:0003 is changed; when the contents of memory location 0x8000:0003 are retrieved at a future time (e.g., during a subsequent clock cycle), the original dataset 402 will no longer be available.

Figure 5:
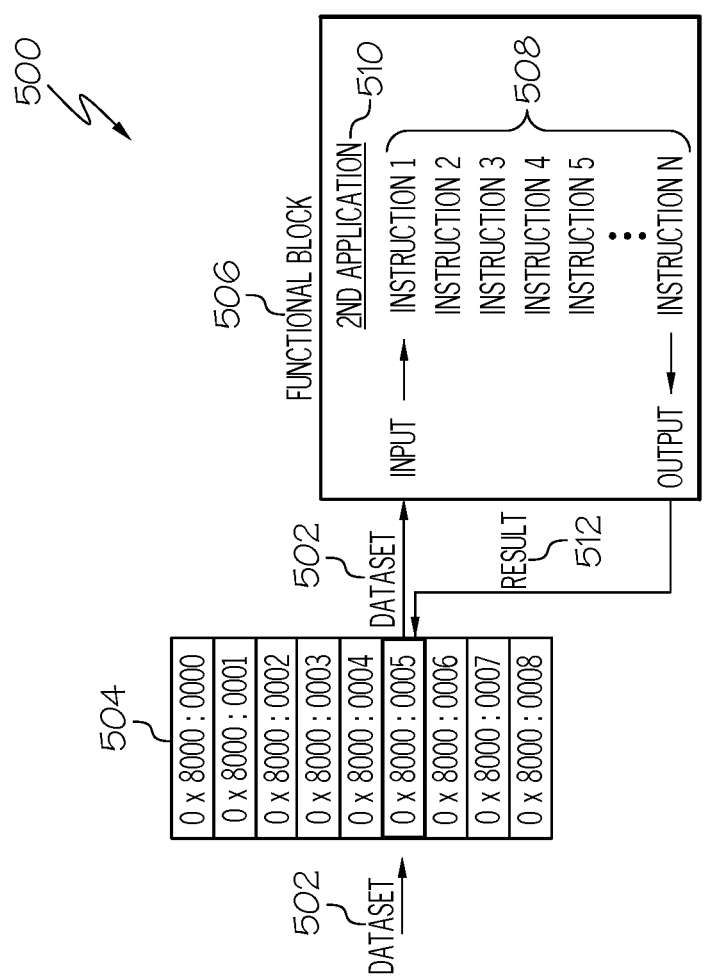
FIG. 5 is a diagram representation of a subset of system memory, configured to access a functional block comprising a second instruction set, according to some embodiments.

In some embodiments, the operation may include an entirely new set of instructions to be performed, as shown in FIG. 5. FIG. 5 is a diagram representation of a subset of an access triggered architecture system 500, including a subset of system memory 504, configured to access a functional block 506 comprising a second set of instructions 508 for a second application 510, according to some embodiments. As shown, a dataset 502 is received at memory location 0x8000:0005, which is associated with a functional block 506. The functional block 506 executes an operation using the received dataset 502 and returns a result 512 to the same memory location. This action of transferring the dataset 502 from a source location (not shown) to memory location 0x8000:0005 is performed by a first application during execution of at least one of a first set of instructions.

Once the dataset 502 is received at memory location 0x8000:0005, the dataset 502 is used as an input value to the functional block 506. Functional block 506 executes a second application, or sub-application, including a second set of instructions 508. The second set of instructions 508 is not "seen" or recognized by the first set of instructions, which is associated with the first application. Similar to the first set of instructions, each one of the second set of instructions 508 includes a command to relocate a set of data from a source location to a destination location in system memory. The first instruction, of the second set of instructions 508, relocates the dataset 502 from memory location 0x8000:0005 (i.e., the source location) to another memory address (i.e., the destination location—not shown) for performance of another operation associated with another functional block. In this example, the second application 510 executes the second set of instructions 508, sequentially, to produce an output result 512. Each of the second set of instructions 508 executes a single function or operation, and the entire second set of instructions 508 is used for a more complex operation, requiring more than a one-step function.

As is the case when memory location 0x8000:0005 is associated with a single-step operation, once the output result 512 is generated, the original dataset 502 transmitted to memory location 0x8000:0005 is changed. When the contents of memory location 0x8000:0005 are retrieved at a future time (e.g., during a subsequent clock cycle), the original dataset 502 will no longer be available.

Returning to FIG. 3, after performing the operation (step 304), the process 300 returns the generated result to the system memory location (step 306). As shown with regard to FIGS. 4 and 5, once an operation has been performed using the dataset received at a functional block, the dataset itself has been changed or altered by the operation. This result is then stored at the memory location where the dataset was received, effectively overwriting the original dataset. This updated or "new" dataset resides in the memory location, and is available for retrieval and transfer to another functional block in system memory for purposes of performing another single-step operation or a second application comprising multiple single-step operations.

Figure 6:
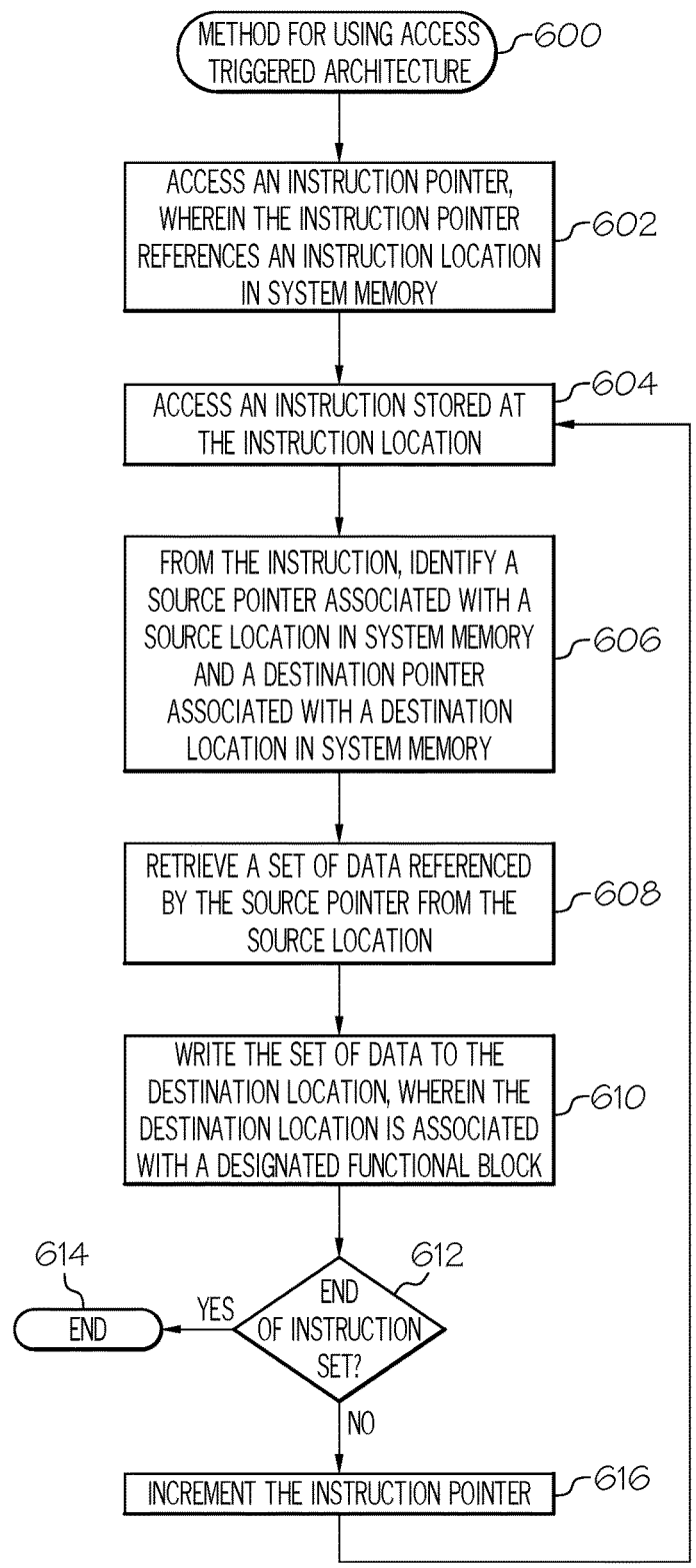
FIG. 6 is a flow chart that illustrates an embodiment of a process for using access triggered architecture.

FIG. 6 is a flow chart that illustrates an embodiment of a process 600 for using access triggered architecture. First, the process 600 receives an instruction pointer, wherein the instruction pointer references a first instruction location in system memory (step 602). The instruction pointer indicates a system memory address at which a first instruction, for a given application, resides. Each application includes a plurality of executable instructions, and the instruction pointer is accessed to begin execution of a particular application.

Next, the process 600 accesses a first instruction stored at the first instruction location (step 604). From the first instruction, the process 600 identifies a source pointer associated with a source location in system memory and a destination pointer associated with a destination location in system memory (step 606). Each instruction includes, at minimum, a source pointer and a destination pointer. Each of these pointers reference an address in system memory, and the system memory is capable of storing a set of data at each address.

The process 600 then retrieves a set of data, referenced by the source pointer, from the source location (step 608), and writes the set of data to the destination location, wherein the destination location is associated with a designated functional block (step 610). The purpose of the process 600 is to execute a series of instructions, in sequence. Each instruction moves a set of data from a source memory location to a destination memory location, enabling a functional block at the destination memory location to perform an operation using the set of data.

After writing the set of data to the destination location in system memory (step 610), the process 600 determines whether the end of the instruction set has been reached (step 612). The process 600 performs data transfers from one system location to another. All behavior of the process 600, including stopping, looping, or execution of new list is encoded within the instructions being executed. In one example, the process 600 performs a loop, in order to execute the instruction set again. In this example, the final instruction of the instruction set may include an instruction to reload the instruction pointer with the address of the beginning of the same list. Alternatively, the final instruction may be to read a functional block until that functional block changes the result to address a new list, or the final instruction may be to repeat the current instruction list only upon occurrence of a detected event.

If the end of the instruction set has been reached (the "Yes" branch of step 612), then the process 600 ends. If the end of the instruction set has not been reached (the "No" branch of step 612), then the process 600 increments the instruction pointer (step 616), and returns to the beginning of the process 600 to access an instruction stored at the instruction location indicated by the incremented instruction pointer (step 604). Each of the executable instructions is stored in sequential order in system memory, for ease of execution. In certain embodiments, a plurality of executable instructions comprises an "instruction table" for an application, including a plurality of instructions stored in sequential order, or in other words, stored in the order in which each instruction will be executed. Each instruction is stored at a particular location in system memory, and each of these locations is referenced by a system memory address. The instruction pointer directs the process 600 to the system memory address of the first instruction of the instruction table. Once incremented, the instruction pointer points to the next memory location at which an instruction is stored, and the process 600 returns to step 604 and begins again.

In certain embodiments, the process 600 first receives an instruction table for an application, prior to the execution of step 602. Here, the instruction table comprises a plurality of instructions, and the instruction stored at the instruction location indicated by the instruction pointer is one of the instructions found in the instruction table. Each of the plurality of instructions, contained in the instruction table, comprises a command to move information form a source memory location to a destination memory location. Using the instruction table, the process 600 executes each of the plurality of instructions, sequentially, through the process 600 steps described in FIG. 6. Each time the instruction pointer is incremented (step 616), the process 600 moves forward to execute the next step in the instruction table. In some embodiments, when each of the plurality of instructions has been executed, sequentially, the process 600 receives a second instruction table comprising a second plurality of instructions, and executes each of the second plurality of instructions sequentially, wherein each of the second plurality of instructions also comprises a command to move information from a source memory location to a destination memory location associated with a functional block.

Figure 7:
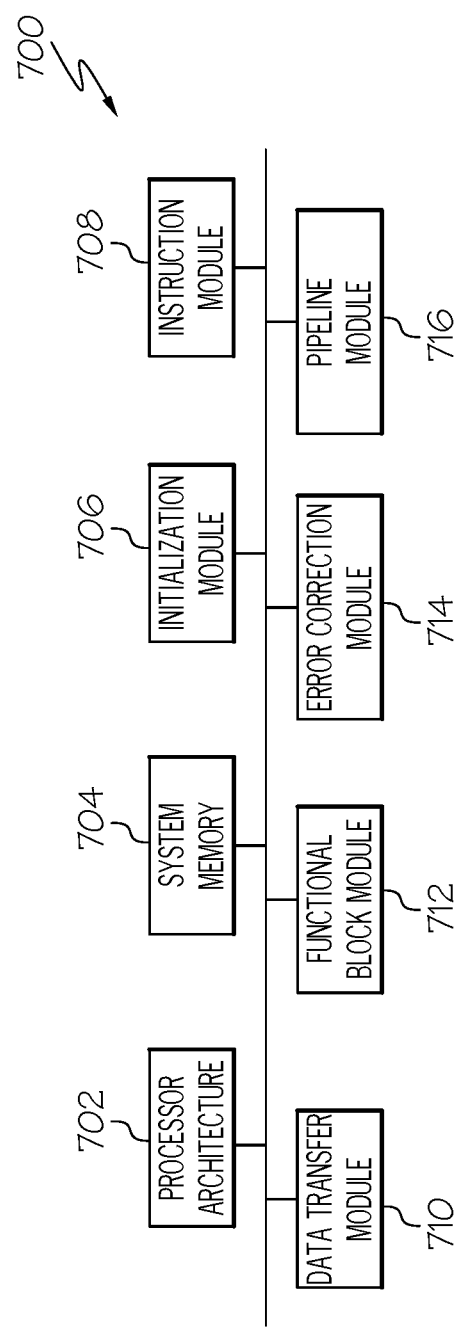
FIG. 7 is a schematic block diagram representation of an access triggered architecture system that uses pipelining and error correction techniques, according to the disclosed embodiments.

Error Correction and Pipelining Techniques for an Access Triggered Architecture FIG. 7 is a schematic block diagram representation of an access triggered architecture system 700 that uses pipelining and error correction techniques, according to the disclosed embodiments. The illustrated embodiment of the access triggered architecture system 700 generally includes, without limitation: a processor architecture 702; system memory 704; an initialization module 706; an instruction module 708; a data transfer module 710; a functional block module 712; an error correction module 714; and a pipeline module 716. These elements and features of the access triggered architecture system 700 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 7. Moreover, it should be appreciated that embodiments of the access triggered architecture system 700 will include other elements, modules, and features that cooperate to support the desired functionality. For simplicity, FIG. 7 only depicts certain elements that relate to the error correction and pipelining techniques, for an access triggered computer architecture, described in more detail below.

The processor architecture 702, system memory 704, initialization module 706, instruction module 708, data transfer module 710, and functional block module 712 are similar in configuration and function to their counterpart items described above in the context of the access triggered architecture system shown in FIG. 1. Accordingly, common features and operations of these elements of the access triggered architecture system 700 will not be redundantly described here.

The error correction module 714 is configured to perform error correction for the access triggered architecture system 700 such that the system 700 can determine whether the retrieved data is accurate, valid, or otherwise correct. The error correction module 714 uses parity bits, error correcting codes (ECCs), and/or other error correction techniques that are well-known and commonly used in the art. The error correction module 714 is configured to identify corrupt data. In some embodiments, the error correction module 714 is configured to identify data that has been corrupted or is otherwise incorrect, and also to correct the data such that the data returns to a state of being correct.

The pipeline module 716 is configured to streamline operations of the access triggered architecture system 700 such that the access triggered architecture system 700 can execute and perform multiple operations simultaneously (i.e., during the same clock cycle). The pipeline module 716 generally performs such simultaneous operations using two or more data buses of the access triggered architecture system 700 (e.g., a data bus, an instruction bus, or the like).

In practice, the error correction module 714 and/or the pipeline module 716 may be implemented with (or cooperate with) the processor architecture 702 to perform at least some of the functions and operations described in more detail herein. In this regard, the error correction module 714 and/or the pipeline module 716 may be realized as suitably written processing logic, application program code, or the like.

FIG. 8 is a diagram representation of a typical operation 800 executed by an access triggered architecture, in accordance with the disclosed embodiments. The typical operation 800 includes four (4) sub-operations, and each of the sub-operations is executed during a sequential clock cycle. Thus, execution of the illustrated typical operation 800 requires four (4) clock cycles for completion. The sub-operations of the typical operation 800 are executed such that the access triggered architecture reads an instruction set, and then uses the instructions to move a set of data from a location in system memory to a functional block where one or more operations may be performed using the set of data as an input value. This process is described in detail previously, with regard to the description of FIGS. 1-6.

During a first clock cycle, the first sub-operation is executed, and the first sub-operation is to read a source pointer 802. The instruction set includes a source pointer and a destination pointer, as described previously. Here, the source pointer of the instruction set is read during the first clock cycle. During a second clock cycle, the second sub-operation is executed, and the second sub-operation is to read a destination pointer 804. Here, the destination pointer of the instruction set is read during the second clock cycle. Thus, the instruction set (that includes a source pointer and a destination pointer) is read in the first two clock cycles of the typical operation 800. During a third clock cycle, the third sub-operation is executed, and the third sub-operation is to read data from the source pointer 806. The source pointer references a location in system memory that stores the data, and the data is read at the system memory location during the third clock cycle. During a fourth clock cycle, the fourth sub-operation is executed, and the fourth sub-operation is to write the data to the destination pointer 808. The destination pointer references a second location in system memory, wherein the second location includes the functional block where one or more operations are performed using the data as an input value. Here, the data is written to the second location indicated by the destination pointer during the fourth clock cycle.

FIG. 9 is a diagram representation of a sequence 900 of multiple typical operations 902, 904, 906. The multiple typical operations 902, 904, 906 are executed sequentially, in accordance with the disclosed embodiments. Each of the multiple typical operations 902, 904, 906 include four (4) sub-operations, and each of the sub-operations is executed during a sequential clock cycle, as described previously with regard to FIG. 8. Also, as described previously with regard to FIG. 8, the sub-operations include: reading a source pointer during a first sequential clock cycle, reading a destination pointer during a second sequential clock cycle, reading data from a source pointer during a third sequential clock cycle, and writing data to a destination pointer during a fourth sequential clock cycle. As shown, the sequence 900 includes typical operation 904 executed after typical operation 902, and typical operation 906 executed after typical operation 904. Each of the multiple typical operations 902, 904, 906 is performed by the access triggered architecture, in order, during sequential clock cycles.

During the last of the four sub-operations (e.g., writing data to a destination pointer during a fourth sequential clock cycle), the access triggered architecture system increments an instruction pointer to a next instruction of a plurality of instructions (i.e., an instruction set comprising the plurality of instructions). The instruction pointer can be influenced by a functional unit (e.g., a functional block, as described with regard to FIGS. 1-7 and 15-16) to create jumps, branches, and to be guarded from illegal jumps and/or illegal branches, as needed.

Figure 10:
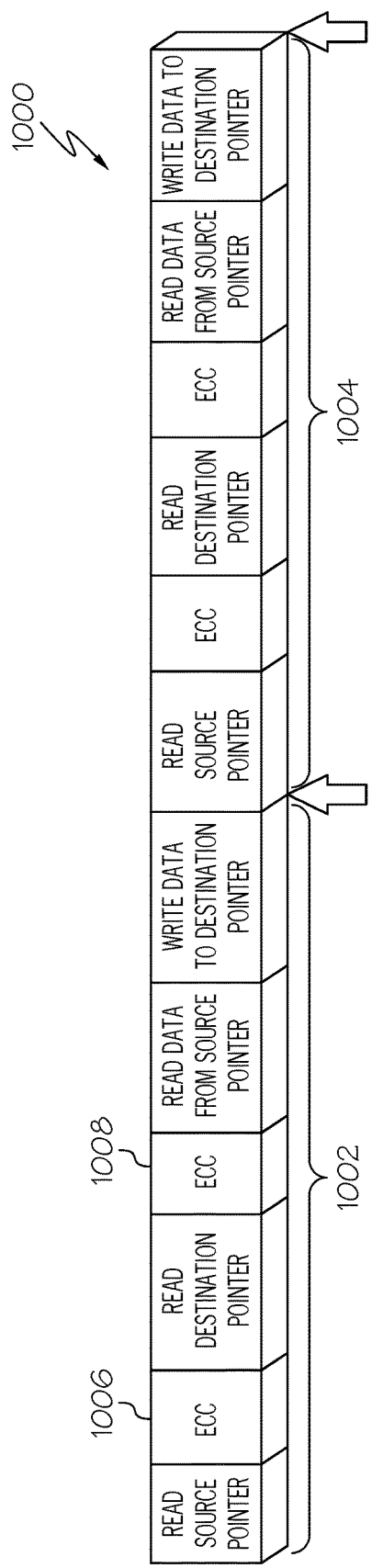
FIG. 10 is a diagram representation of multiple enhanced operations executed sequentially, in accordance with the disclosed embodiments.

FIG. 10 is a diagram representation of a sequence 1000 of multiple enhanced operations 1002, 1004 executed sequentially, in accordance with the disclosed embodiments. As shown, the sequence 1000 includes multiple operations 1002, 1004 executed sequentially, as described previously with regard to FIG. 9. However, FIG. 9 depicts the sequential execution of typical operations that include: reading a source pointer during a first sequential clock cycle, reading a destination pointer during a second sequential clock cycle, reading data from a source pointer during a third sequential clock cycle, and writing data to a destination pointer during a fourth sequential clock cycle.

In contrast, the sequence 1000 illustrated in FIG. 10 depicts the sequential execution of enhanced operations 1002, 1004 that include: reading a source pointer during a first sequential clock cycle; performing error correction 1006 using error-correcting codes (ECCs) during a second sequential clock cycle; reading a destination pointer during a third sequential clock cycle; performing error correction 1008 using ECCs during a fourth sequential clock cycle; reading data from a source pointer during a fifth sequential clock cycle; and writing data to a destination pointer during a sixth sequential clock cycle.

Here, error correction techniques are incorporated into a typical access triggered architecture operation. The sub-operations of the typical access triggered architecture operation are performed, and error correction is used to ensure that operations of the access triggered architecture produces reliable and accurate results. During the second clock cycle, error correction is performed 1006 to verify accuracy of the source pointer read during the first clock cycle. During the fourth clock cycle, error correction is performed 1008 to verify accuracy of the destination pointer read during the third clock cycle. Thus, the enhanced operations 1002, 1004 provide improved accuracy and reliability of the access triggered architecture. Additionally, in some embodiments, error correction techniques are used to verify the data read from the source pointer during the fifth sequential clock cycle. This may be completed as an in-line clock cycle of latency.

Figure 11:
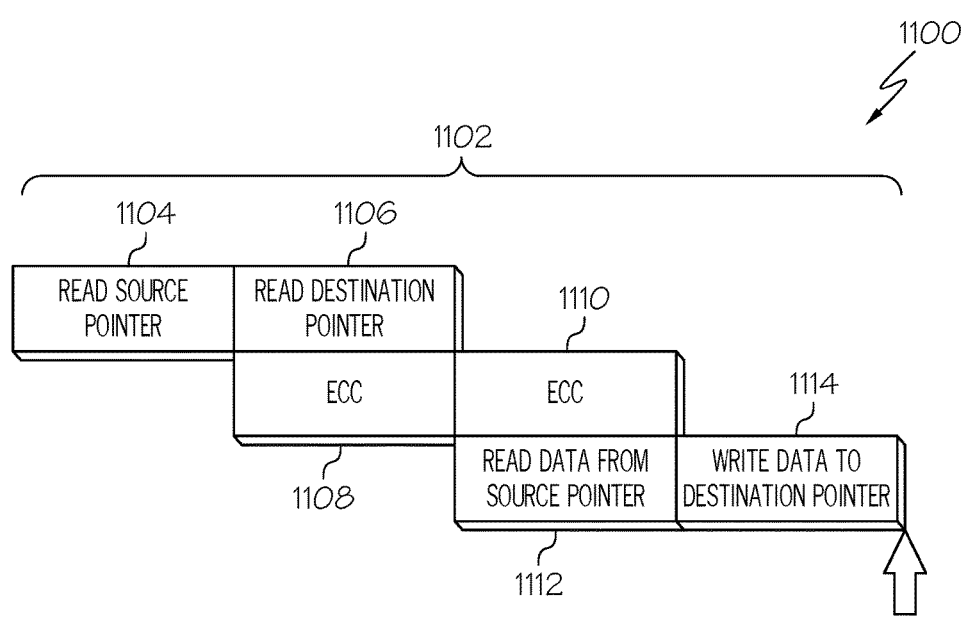
FIG. 11 is a diagram representation of an enhanced operation executed using a pipeline structure, in accordance with the disclosed embodiments.

FIG. 11 is a diagram representation of an enhanced operation 1102 executed using a pipeline structure, in accordance with the disclosed embodiments. The enhanced operation 1102 performed by the access triggered architecture includes the enhanced operations described previously with regard to FIG. 10. However, the enhanced operation 1102 differs from the enhanced operations of FIG. 10 in that enhanced operation 1102 uses a pipeline structure to perform simultaneous operations to reduce execution time. The pipeline structures 1100 depict the pipelined execution of enhanced operation 1102, which includes: (1) reading a source pointer 1104 during a first sequential clock cycle; (2) reading a destination pointer 1106 and, in parallel, performing error correction 1108 using error-correcting codes (ECCs) during a second sequential clock cycle; (3) performing error correction 1110 using ECCs and, in parallel, reading data from the source pointer 1112 during a third sequential clock cycle; and (4) writing data to a destination pointer 1114 during a fourth sequential clock cycle.

Figure 12:
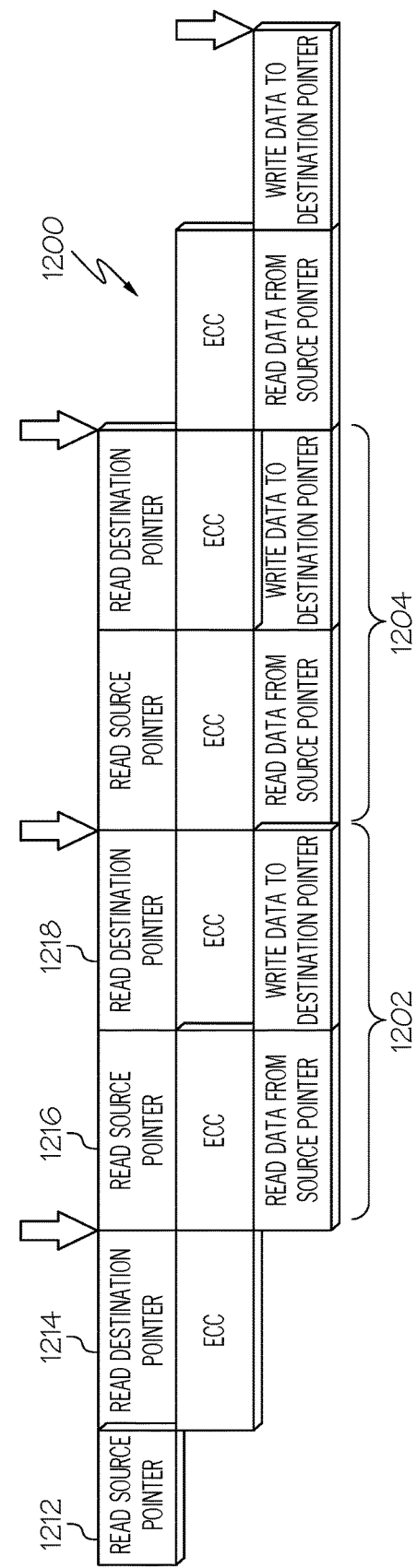
FIG. 12 is a diagram representation of multiple enhanced operations executed using a pipeline structure and instruction memory error correction, in accordance with the disclosed embodiments.

As shown, the total time required to perform one complete enhanced operation 1102 is four clock cycles. However, as depicted in FIG. 12, the simultaneously executed sub-operations are arranged such that several sub-operations of sequential enhanced operations overlap and are performed in parallel. Thus, two clock cycles are required to obtain results for each sub-operation. FIG. 12 is a diagram representation of multiple enhanced operations 1200 executed using a pipeline structure, in accordance with the disclosed embodiments.

As shown, multiple enhanced operations 1200 are executed using a pipeline structure, such that sub-operations may be performed simultaneously to reduce execution time. Each of the multiple enhanced operations 1200 performs the same sub-operations as the enhanced operation 1102 illustrated in FIG. 11, which includes: (1) reading a source pointer 1212 during a first sequential clock cycle; and (2) reading a destination pointer 1214 and performing error correction using error-correcting codes (ECCs) during a second sequential clock cycle. However, during the third sequential clock cycle, sub-operations include reading another source pointer 1216, performing error correction using ECCs, and reading data from the first source pointer (e.g., the location indicated by the read source pointer 1212). Also differing from FIG. 11, during the fourth sequential clock cycle, sub-operations include reading another destination pointer 1218, performing error correction using ECCs, and writing data to a destination pointer.

Thus, during the third sequential clock cycle and the fourth sequential clock cycle, the access triggered architecture system completes a first enhanced operation 1202 (e.g., by reading data from the source pointer and writing the data to the destination pointer), while also simultaneously beginning a second enhanced operation 1204 (e.g., by reading a second source pointer 1216 and reading a second destination pointer 1218). As a result, each of the multiple enhanced operations 1200 is completed every two (2) clock cycles.

Figure 13:
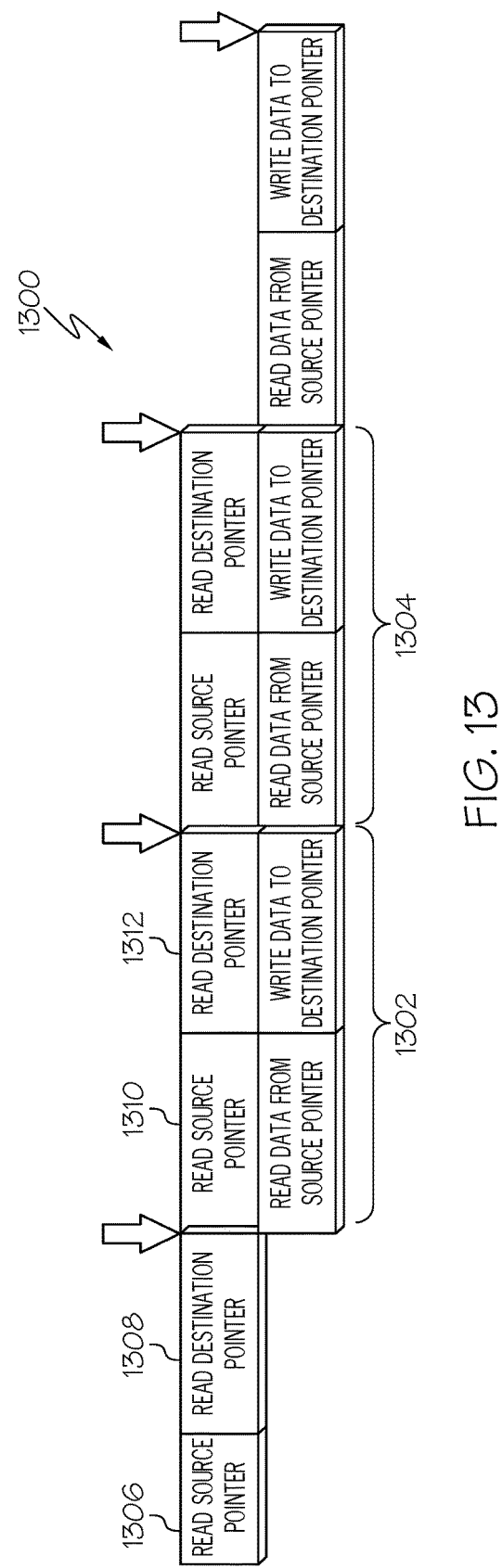
FIG. 13 is a diagram representation of multiple typical operations executed using a pipeline structure without error correction.

FIG. 13 is a diagram representation of multiple typical operations 1300 executed using a pipeline structure. The multiple typical operations 1300 depicted in FIG. 13 are similar to the multiple enhanced operations of FIG. 12, which include reading a source pointer 1306 during a first sequential clock cycle; reading a destination pointer 1308 during a second sequential clock cycle; reading a second source pointer 1310 and reading data from the first source pointer during a third sequential clock cycle; and reading a second destination pointer 1312 and writing the data to the first destination pointer during a fourth sequential clock cycle. However, the multiple typical operations 1300 differ from the multiple enhanced operations of FIG. 12 in that the multiple typical operations 1300 do not include additional simultaneous operations for performing error correction using ECCs.

As shown, during the third sequential clock cycle and the fourth sequential clock cycle, the access triggered architecture system completes a first typical operation 1302 (e.g., by reading data from the source pointer and writing the data to the destination pointer), while also simultaneously beginning a second enhanced operation 1304 (e.g., by reading a second source pointer 1310 and reading a second destination pointer 1312). As a result, each of the multiple typical operations 1300 is completed every two (2) clock cycles.

Figure 14:
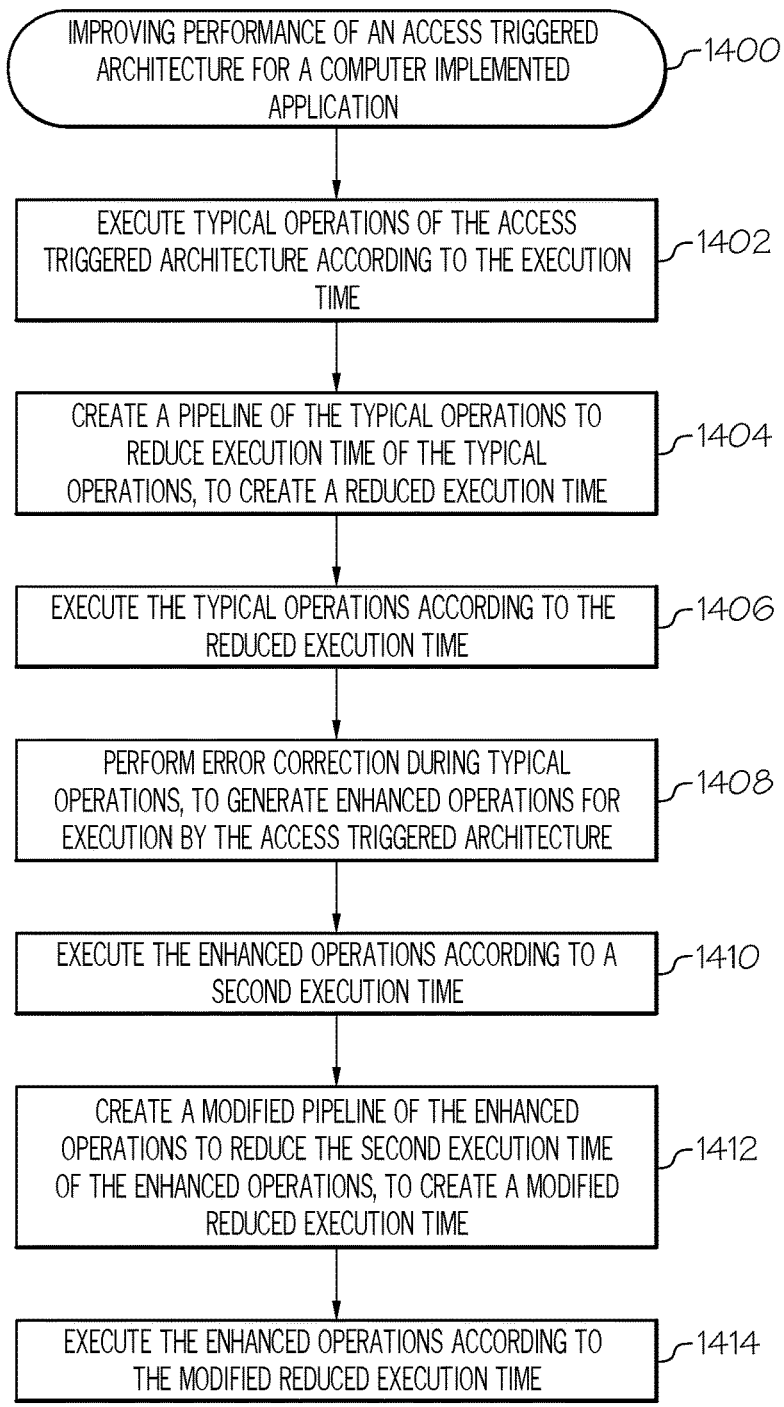
FIG. 14 is a flow chart that illustrates an embodiment of a process for improving performance of an access triggered architecture for a computer implemented application, in accordance with the disclosed embodiments.

FIG. 14 is a flow chart that illustrates an embodiment of a process 1400 for improving performance of an access triggered architecture for a computer implemented application, in accordance with the disclosed embodiments. First, the process 1400 executes typical operations of the access triggered architecture system according to an execution time (step 1402). Typical operations of the access triggered architecture system were described previously with regard to FIGS. 1-6. These typical operations are generally executed sequentially, and in some embodiments, require four (4) clock cycles for completion, as described previously with regard to FIGS. 8-9. One exemplary embodiment of executing typical operations is described in detail in FIG. 15, and one exemplary embodiment of executing typical operations according to the execution time is described in detail in FIG. 17.

Next, the process 1400 creates a pipeline of the typical operations to reduce execution time of the typical operations, to create a reduced execution time (step 1404), and after creating the pipeline of the typical operations, the process 1400 executes the typical operations according to the reduced execution time (step 1406). One exemplary embodiment of executing typical operations according to the reduced execution time is described in detail in FIG. 18.

A pipeline is an implementation technique wherein multiple computer instructions are overlapped such that the computer instructions are executed and performed simultaneously. In certain embodiments, simultaneous execution indicates that the multiple pipelined computer instructions are executed and performed during the same clock cycle of the access triggered architecture. As described herein, a pipeline is an implementation technique wherein multiple sub-operations of a typical operation or an enhanced operation of an access triggered architecture system are overlapped such that the sub-operations are executed and performed simultaneously. Here, the process 1400 is configured to streamline operations of the access triggered architecture system such that the access triggered architecture system executes and performs multiple operations simultaneously (i.e., during the same clock cycle). The process 1400 generally performs such simultaneous operations using two or more data buses of the access triggered architecture system (e.g., a data bus, an instruction bus, or the like).

Pipelined typical operations are described herein with regard to FIG. 13. In the embodiment described, during the third sequential clock cycle and the fourth sequential clock cycle, the access triggered architecture system completes a first typical operation 1302 (e.g., by reading data from the source pointer and writing the data to the destination pointer), while also simultaneously beginning a second enhanced operation 1304 (e.g., by reading a second source pointer 1310 and reading a second destination pointer 1312). As a result, each of the multiple typical operations 1300 is completed every two (2) clock cycles.

Returning to FIG. 14, in certain embodiments, the process 1400 also performs error correction during typical operations to generate enhanced operations for execution by the access triggered architecture (step 1408). Here, the process 1400 is configured to perform error correction for the access triggered architecture system to determine whether the retrieved data is accurate, valid, or otherwise correct. The process 1400 uses parity bits, error correcting codes (ECCs), and/or other error correction techniques that are well-known and commonly used in the art. The process 1400 is configured to identify corrupt data. In some embodiments, the process 1400 is configured to identify data that has been corrupted or is otherwise incorrect, and also to correct the data such that the data returns to a state of being correct. In exemplary embodiments, described with regard to step 1408, the process 1400 performs error correction to verify the accuracy of obtained source pointers and destination pointers, as shown in FIGS. 10-12. In other embodiments, error correction is used to verify the accuracy of data obtained from a system memory location indicated by an obtained source pointer.

The process 1400 executes the enhanced operations according to a second execution time (step 1410). One exemplary embodiment of executing the enhanced operations according to a second execution time is described in detail in FIG. 19. The second execution time is a "normal" execution time for the enhanced operations, when the enhanced operations are performed sequential, or in other words, in a sequential order, as shown in FIG. 10. Here, the sequence 1000 illustrated in FIG. 10 depicts the sequential execution of enhanced operations 1002, 1004, such that each of the enhanced operations 1002, 1004 require six (6) consecutive clock cycles for completion. Each of the enhanced operations 1002, 1004 includes the following sub-operations: reading a source pointer during a first sequential clock cycle; performing error correction 1006 using error-correcting codes (ECCs) during a second sequential clock cycle; reading a destination pointer during a third sequential clock cycle; performing error correction 1008 using ECCs during a fourth sequential clock cycle; reading data from a source pointer during a fifth sequential clock cycle; and writing data to a destination pointer during a sixth sequential clock cycle. The six (6) consecutive, sequential clock cycles used to complete each of the enhanced operations 1002, 1004 represents the second execution time, or in other words, the "normal" execution time required to perform the enhanced operations sequentially.

Returning to FIG. 14, the process 1400 then creates a modified pipeline of the enhanced operations to reduce the second execution time of the enhanced operations, to create a modified reduced execution time (step 1412). One exemplary embodiment of the modified pipeline of the enhanced operations is illustrated in FIG. 12. As described previously, the modified pipeline is implemented by the process 1400 to reduce the required execution time of the enhanced operations by performing sub-operations simultaneously, and thus, by requiring fewer clock cycles to perform the sub-operations of the enhanced operations, wherein each of the enhanced operations includes: (i) typical operations of the access triggered architecture system, and (ii) error correction procedures incorporated to ensure integrity of the data obtained and used during typical operations of the access triggered architecture system.

The process 1400 then executes the enhanced operations according to the modified reduced execution time (step 1414). One exemplary embodiment of executing enhanced operations according to the modified reduced execution time is described in detail in FIG. 20. The exemplary embodiments described with respect to FIGS. 12 and 20 reduce the time required (e.g., the number of required clock cycles) to complete each enhanced operation from a sequential execution requiring six (6) clock cycles to a pipelined execution requiring two (2) clock cycles. The process 1400 accomplishes this pipelined execution (e.g., the modified pipeline of the enhanced operations) using two or more data buses within the access triggered architecture.

Figure 15:
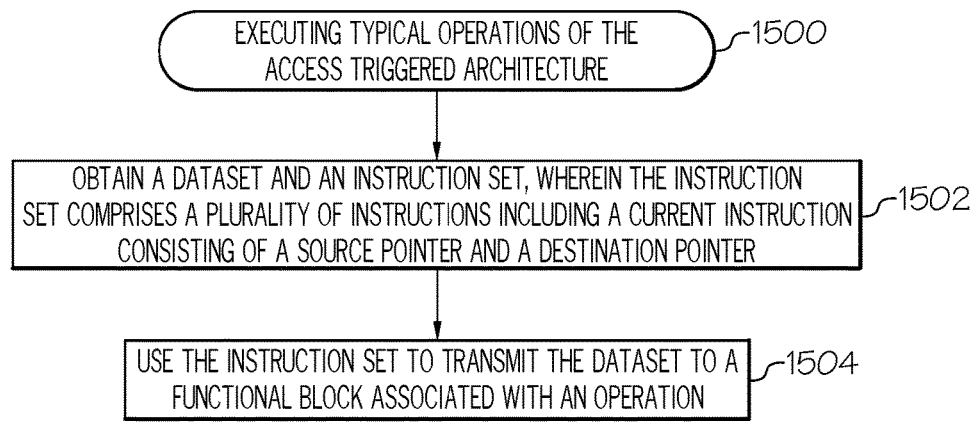
FIG. 15 is a flow chart that illustrates an embodiment of a process for executing typical operations of the access triggered architecture, in accordance with the disclosed embodiments.

FIG. 15 is a flow chart that illustrates an embodiment of a process 1500 for executing typical operations of the access triggered architecture, in accordance with the disclosed embodiments. It should be appreciated that the process 1500 described in FIG. 15 represents one embodiment of step 1402 described above in the discussion of FIG. 14, including additional detail. First, the process 1500 obtains a dataset and an instruction set, wherein the instruction set comprises a plurality of instructions including a current instruction consisting of a source pointer and a destination pointer (step 1502). Next, the process 1500 uses the instruction set to transmit the dataset to a functional block associated with an operation (step 1504). One suitable methodology for using the instruction set to transmit the dataset to a functional block associated with an operation is described below with reference to FIG. 16.

Figure 16:
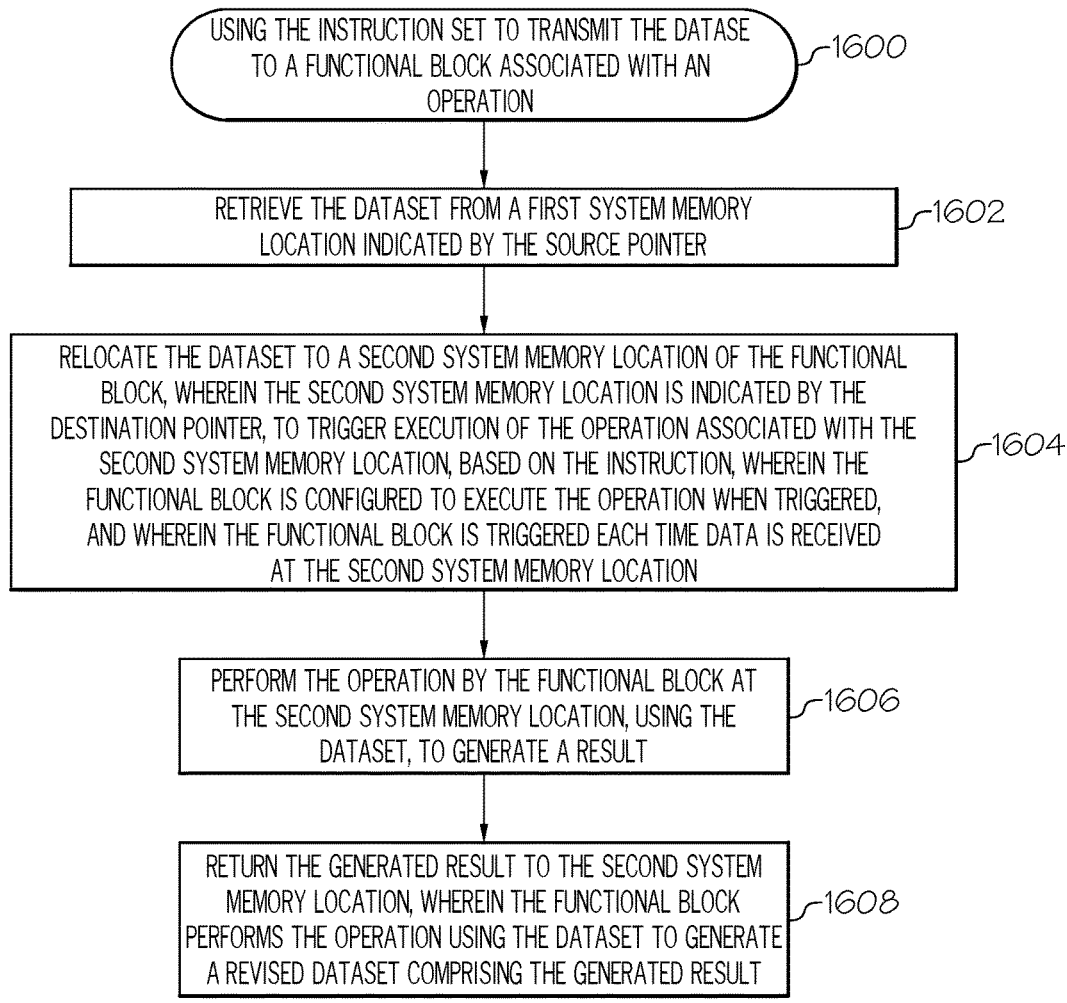
FIG. 16 is a flow chart that illustrates an embodiment of a process for using the instruction set to transmit the dataset to a functional block associated with an operation, in accordance with the disclosed embodiments.

FIG. 16 is a flow chart that illustrates an embodiment of a process 1600 for using the instruction set to transmit the dataset to a functional block associated with an operation, in accordance with the disclosed embodiments. It should be appreciated that the process 1600 described in FIG. 16 represents one embodiment of step 1502 described above in the discussion of FIG. 15, including additional detail. First, the process 1600 retrieves the dataset from a first system memory location indicated by the source pointer (step

1602). Next, the process 1600 relocates the dataset to a second system memory location of the functional block, wherein the second system memory location is indicated by the destination pointer, to trigger execution of the operation associated with the second system memory location, based on the instruction, wherein the functional block is configured to execute the operation when triggered, and wherein the functional block is triggered each time data is received at the second system memory location (step 1604). The process 1600 then performs the operation by the functional block at the second system memory location, using the dataset, to generate a result (step 1606). The process 1600 returns the generated result to the second system memory location, wherein the functional block performs the operation using the dataset to generate a revised dataset comprising the generated result (step 1608).

Figure 17:
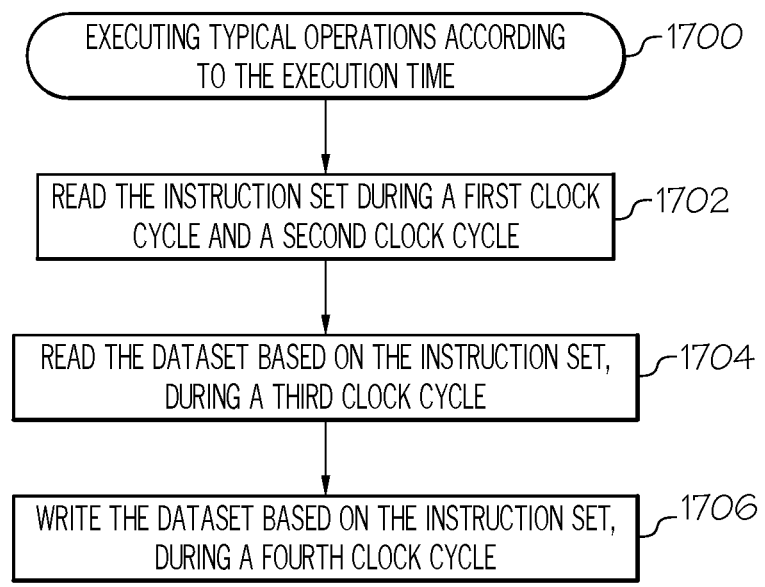
FIG. 17 is a flow chart that illustrates an embodiment of a process for executing typical operations according to the execution time, in accordance with the disclosed embodiments.

FIG. 17 is a flow chart that illustrates an embodiment of a process 1700 for executing typical operations according to the execution time, in accordance with the disclosed embodiments. It should be appreciated that the process 1700 described in FIG. 17 represents one embodiment of step 1402 described above in the discussion of FIG. 14, including additional detail. Further, exemplary embodiments of the execution of typical operations of the access triggered architecture system are described with regard to FIGS. 8-9.

The process 1700 reads the instruction set during a first clock cycle and a second clock cycle (step 1702). The process 1700 reads the dataset based on the instruction set, during a third clock cycle (step 1704). The process 1700 writes the dataset based on the instruction set, during a fourth clock cycle (step 1706). As described herein, the first clock cycle, the second clock cycle, the third clock cycle, and the fourth clock cycle are sequential clock cycles used by the access triggered architecture system. Each of the steps of the process 1700 are executed during the sequential clock cycles, and are thus performed in order and in sequence.

Figure 18:
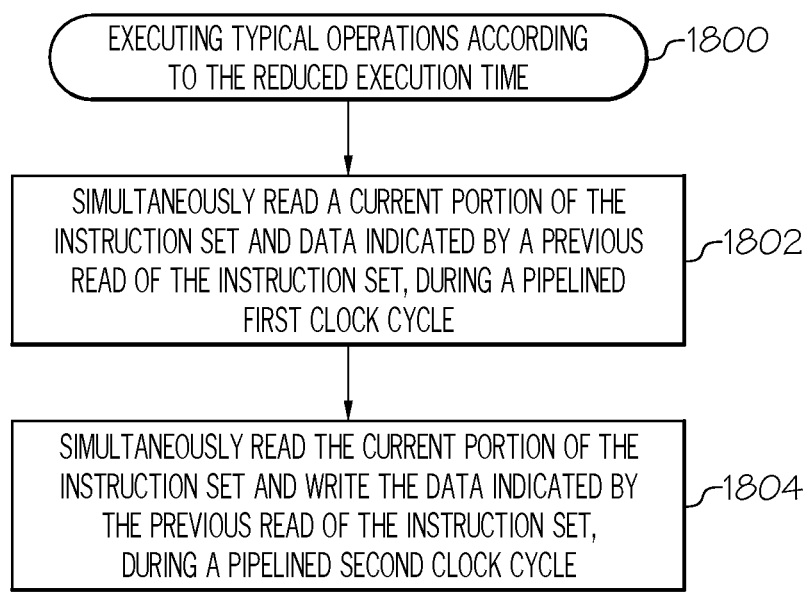
FIG. 18 is a flow chart that illustrates an embodiment of a process for executing typical operations according to the reduced execution time, in accordance with the disclosed embodiments.

FIG. 18 is a flow chart that illustrates an embodiment of a process for executing typical operations according to the reduced execution time, in accordance with the disclosed embodiments. It should be appreciated that the process 1800 described in FIG. 18 represents one embodiment of step 1406 described above in the discussion of FIG. 14, including additional detail. Further, exemplary embodiments of the execution of typical operations of the access triggered architecture system according to a reduced execution time are described with regard to FIG. 13.

The process 1800 simultaneously reads a current portion of the instruction set and data indicated by a previous read of the instruction set, during a pipelined first clock cycle (step 1802). The current portion of the instruction set includes a source pointer 1310 and a destination pointer 1312, shown in FIG. 13. Here, the process 1800 reads data indicated by the source pointer 1306 that was read during a previous clock cycle, while simultaneously reading a new source pointer 1310. The process 1800 then simultaneously reads the current portion of the instruction set and writes the data indicated by the previous read of the instruction set, during a pipelined second clock cycle (step 1804). The current portion of the instruction set includes a source pointer 1310 and a destination pointer 1312, shown in FIG. 13. Here, the process 1800 writes the data indicated by the source pointer 1306 that was read during a previous clock cycle, wherein the process 1800 writes the data to the location indicated by the previously obtained destination pointer 1308. Simultaneously, the process 1800 reading a new destination pointer 1312.

Figure 19:
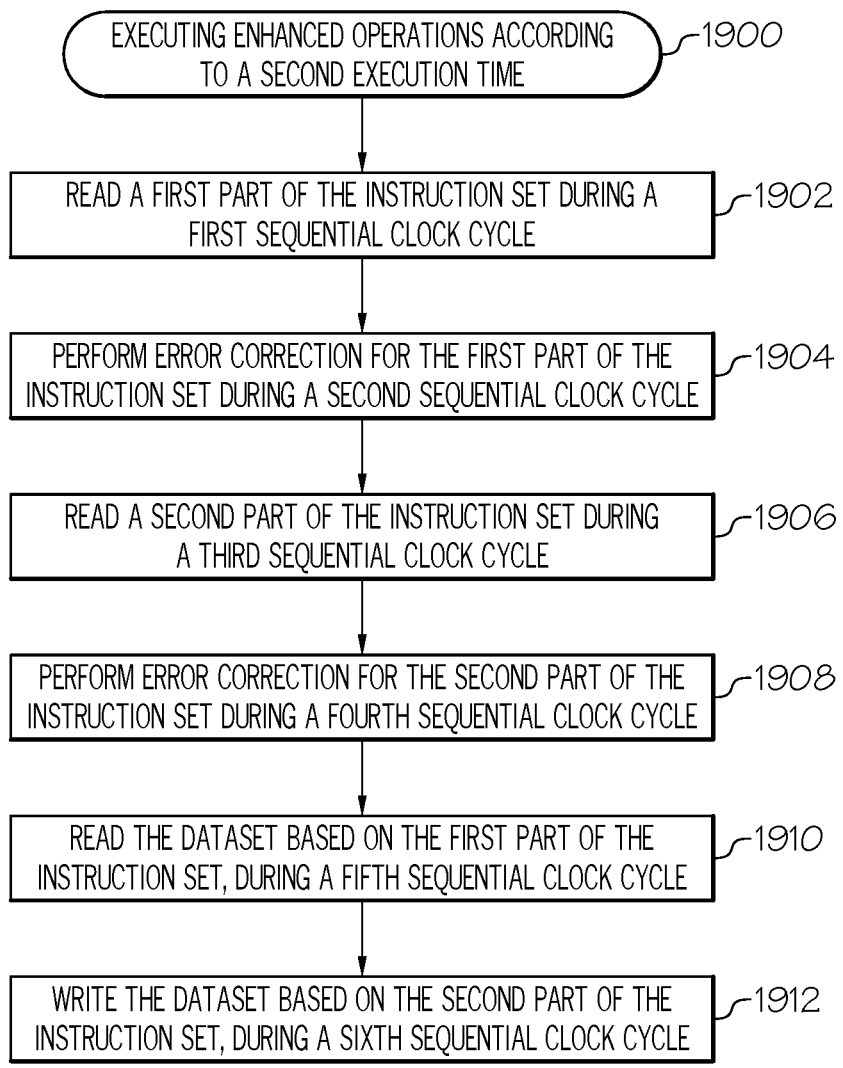
FIG. 19 is a flow chart that illustrates an embodiment of a process for executing enhanced operations according to a normal execution time, in accordance with the disclosed embodiments.

FIG. 19 is a flow chart that illustrates an embodiment of a process 1900 for executing enhanced operations according to a normal execution time, in accordance with the disclosed embodiments. It should be appreciated that the process 1900 described in FIG. 19 represents one embodiment of step 1410 described above in the discussion of FIG. 14, including additional detail. Further, exemplary embodiments of the execution of enhanced operations according to a normal execution time are described with regard to FIG. 10.

First, the process 1900 reads a first part of the instruction set during a first sequential clock cycle (step 1902). As shown in FIG. 10, the instruction set includes a source pointer and a destination pointer, for relocation of a dataset. Here, the process 1900 reads the first part of the instruction set during a first clock cycle. In the exemplary embodiment shown in FIG. 10, the first part of the instruction set is the source pointer. However, it should be noted that in other embodiments, the process 1900 may read the destination pointer during a first sequential clock cycle and the source pointer during a second sequential clock cycle. The order for the process 1900 to read or obtain the source pointer and destination pointer may differ, based on implementation of the access triggered architecture system. Next, the process 1900 performs error correction for the first part of the instruction set during a second sequential clock cycle (step 1904). Here, the process 1900 may use error correcting codes (ECCs) to verify the accuracy of the obtained first part of the instruction set.

The process 1900 then reads a second part of the instruction set during a third sequential clock cycle (step 1906). As described with regard to FIG. 10, the process 1900 reads the destination pointer during the third sequential clock cycle. However, in other embodiments, the destination pointer may be read during the first sequential clock cycle and the source pointer may be obtained during the third sequential clock cycle. The process 1900 performs error correction for the second part of the instruction set during a fourth sequential clock cycle (step 1908).

The process 1900 reads the dataset based on the first part of the instruction set, during a fifth sequential clock cycle (step 1910). Here, the process 1900 uses the source pointer (obtained during the first sequential clock cycle) to identify a location in system memory indicated by the source pointer, and the process 1900 reads the data stored at the indicated system memory location. The process 1900 writes the dataset based on the second part of the instruction set, during a sixth sequential clock cycle (step 1912). The process 1900 uses the destination pointer (obtained during the third sequential clock cycle) to identify a destination location in system memory indicated by the destination pointer, and the process 1900 writes the data to the indicated destination location in system memory.

Figure 20:
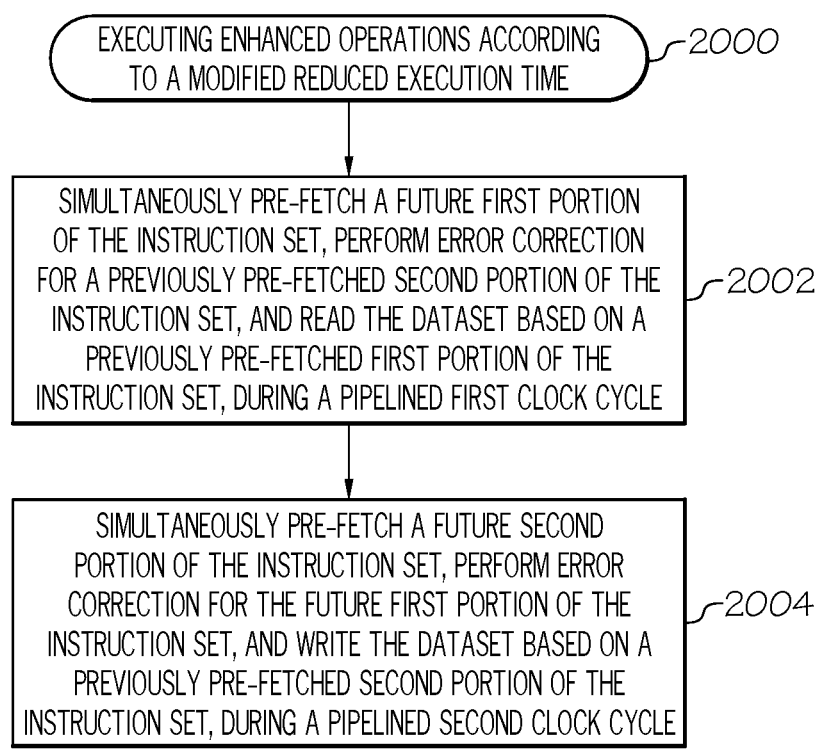
FIG. 20 is a flow chart that illustrates an embodiment of a process for executing enhanced operations according to a modified reduced execution time, in accordance with the disclosed embodiments.

FIG. 20 is a flow chart that illustrates an embodiment of a process 2000 for executing enhanced operations according to a modified reduced execution time, in accordance with the disclosed embodiments. It should be appreciated that the process 2000 described in FIG. 20 represents one embodiment of step 1414 described above in the discussion of FIG. 14, including additional detail. Further, exemplary embodiments of the execution of enhanced operations according to a modified reduced execution time are described with regard to FIG. 12.

The process 2000 simultaneously pre-fetches a future first portion of the instruction set, performs error correction for a previously pre-fetched second portion of the instruction set, and reads the dataset based on a previously pre-fetched first portion of the instruction set, during a pipelined first clock cycle (step 2002). The process 2000 then simultaneously pre-fetches a future second portion of the instruction set, performs error correction for the future first portion of the instruction set, and writes the dataset based on a previously pre-fetched second portion of the instruction set, during a pipelined second clock cycle (step 2004).

The various tasks performed in connection with processes 200, 300, 600, and 1400-2000 (described with regard to FIGS. 2, 3, 6, and 14-20) may be performed by software, hardware, firmware, or any combination thereof. For illustrative purposes, the preceding descriptions of processes 200, 300, 600, and 1400-2000 may refer to elements mentioned in connection with FIGS. 1, 4, 5, and/or 7-13. In practice, portions of processes 200, 300, 600, and 1400-2000 may be performed by different elements of the described system. It should be appreciated that processes 200, 300, 600, and 1400-2000 may include any number of additional or alternative tasks, the tasks shown in FIGS. 2, 3, 6, and 14-20 need not be performed in the illustrated order, and processes 200, 300, 600, and 1400-2000 may each be incorporated, individually or in combination, into a more comprehensive procedure or process having additional functionality not described in detail herein. Moreover, one or more of the tasks shown in FIGS. 2, 3, 6, and/or 14-20 could be omitted from an embodiment of one or more of the processes 200, 300, 600, or 1400-2000 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1 and 7 depict exemplary arrangements of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for improving performance of an access triggered architecture for a computer implemented application, the method comprising:
   executing typical operations of the access triggered architecture according to an execution time, wherein the typical operations comprise:
      obtaining a dataset and an instruction set, wherein the instruction set comprises a plurality of instructions, including a current instruction consisting of a source pointer and a destination pointer; and
      using the instruction set to transmit the dataset to a functional block comprising an operation, by:
         retrieving the dataset from a first system memory location indicated by the source pointer;
         relocating the dataset to a second system memory location of the functional block, wherein the second system memory location is indicated by the destination pointer, to trigger execution of the operation of the functional block associated with the second memory location, based on the instruction, wherein the functional block is configured to execute the operation when triggered, and wherein the functional block is triggered each time data is received at the second system memory location;
         performing the operation by the functional block at the second system memory location, using the dataset, to generate a result; and
         returning the generated result to the second system memory location,
   wherein the functional block performs the operation using the dataset to generate a revised dataset;
   creating a pipeline of the typical operations to reduce the execution time of the typical operations, to create a reduced execution time; and
   executing the typical operations according to the reduced execution time, using the pipeline.

2. The method of claim 1, wherein executing the typical operations according to the execution time further comprises:
   reading the instruction set during a first clock cycle and a second clock cycle;
   reading the dataset based on the instruction set, during a third clock cycle; and
   writing the dataset based on the instruction set, during a fourth clock cycle; and
   wherein executing the typical operations according to the reduced execution time further comprises:
      simultaneously reading a current portion of the instruction set and data indicated by a previous read of the instruction set, during a pipelined first clock cycle; and
      simultaneously reading the current portion of the instruction set and writing the data indicated by the previous read of the instruction set.

3. The method of claim 2, wherein executing the typical operations according to the reduced execution time, using the pipeline, further comprises:
   during the pipelined first clock cycle,
      using a first data bus to read the current portion of the instruction set; and
      using a second data bus to read the data indicated by the previous read of the instruction set; and
   during the pipelined second clock cycle,
      using the first data bus to read the current portion of the instruction set; and
      using the second data bus to write the data indicated by the previous read of the instruction set.

4. The method of claim 1, further comprising:
   performing error correction during the typical operations, to generate enhanced operations for execution by the access triggered architecture;
   creating a modified pipeline of the enhanced operations to reduce a second execution time of the enhanced operations, to create a modified reduced execution time; and
   executing the enhanced operations according to the modified reduced execution time, using the modified pipeline.

5. The method of claim 4, wherein executing the enhanced operations according to the second execution time further comprises:
   reading a first part of the instruction set during a first sequential clock cycle;
   performing error correction for the first part of the instruction set during a second sequential clock cycle;
   reading a second part of the instruction set during a third sequential clock cycle;
   performing error correction for the second part of the instruction set during a fourth sequential clock cycle;
   reading the dataset based on the first part of the instruction set during a fifth sequential clock cycle; and
   writing the dataset based on the second part of the instruction set during a sixth sequential clock cycle; and
   wherein executing the enhanced operations according to the modified reduced execution time further comprises:
      simultaneously pre-fetching a future first portion of the instruction set, performing error correction for a previously pre-fetched second portion of the instruction set, and read the dataset based on a previously pre-fetched first portion of the instruction set, during a pipelined first clock cycle; and
      simultaneously pre-fetching a future second portion of the instruction set, performing error correction for the future first portion of the instruction set, and writing the dataset based on the previously pre-fetched second portion of the instruction set, during a pipelined second clock cycle.

6. The method of claim 4, wherein performing the error correction further comprises including incorporating error correcting codes (ECCs) into the typical operations to verify accuracy of the instruction set; and
  wherein the method further comprises using the modified pipeline to simultaneously performing error correction using the ECCs, pre-fetching a future portion of the instruction set, and performing read and write operations for the dataset.

7. The method of claim 1, further comprising:
recognizing a plurality of destination memory locations, wherein the second system memory location comprises one of the plurality of destination memory locations;
identifying a plurality of operations relevant to the computer implemented application; and
associating each of the plurality of destination memory locations with a respective one of the plurality of operations to create a plurality of functional blocks, wherein each of the plurality of functional blocks is located at a respective destination memory location;
wherein the operation comprises one of the plurality of operations; and
wherein the plurality of functional blocks comprises the functional block comprises one of the plurality of functional blocks.

8. The method of claim 7, further comprising:
receiving the instruction set for the computer implemented application, the instruction set comprising a plurality of instructions; and
executing each of the plurality of instructions sequentially, wherein each of the plurality of instructions comprises a command to move information from a source memory location to one of the plurality of destination memory locations;
wherein the dataset is received due to executing one of the plurality of instructions.

9. A system for improving performance of an access triggered architecture for a computer implemented application, the system comprising:
  a system memory element comprising a plurality of system memory locations; and
  at least one processor communicatively coupled to the system memory element, the at least one processor configured to:
    execute typical operations of the access triggered architecture according to an execution time, wherein the typical operations comprise:
      obtaining a dataset and an instruction set, wherein the instruction set comprises a plurality of instructions, including a current instruction consisting of a source pointer and a destination pointer; and
      using the instruction set to transmit the dataset to a functional block comprising an operation, by:
        retrieving the dataset from a first system memory location indicated by the source pointer;
        relocating the dataset to a second system memory location of the functional block, wherein the second system memory location is indicated by the destination pointer, to trigger execution of the operation of the functional block associated with the second memory location, based on the instruction, wherein the functional block is configured to execute the operation when triggered, and wherein the functional block is triggered each time data is received at the second system memory location;
        performing the operation by the functional block at the second system memory location, using the dataset, to generate a result; and
        returning the generated result to the second system memory location,
      wherein the functional block performs the operation using the dataset to generate a revised dataset comprising the generated result;
    create a pipeline of the typical operations to reduce the execution time of the typical operations, to create a reduced execution time; and
    execute the typical operations according to the reduced execution time, using the pipeline.

10. The system of claim 9, wherein the at least one processor is further configured to:
  execute the typical operations according to the execution time, by:
    reading the instruction set during a first clock cycle and a second clock cycle;
    reading the dataset based on the instruction set, during a third clock cycle;
    writing the dataset based on the instruction set, during a fourth clock cycle; and
  execute the typical operations according to the reduced execution time, by:
    simultaneously reading a current portion of the instruction set and data indicated by a previous read of the instruction set, during a pipelined first clock cycle; and
    simultaneously reading the current portion of the instruction set and writing the data indicated by the previous read of the instruction set.

11. The system of claim 10, wherein the at least one processor is configured to execute the typical operations according to the reduced execution time, using the pipeline, by:
  during the pipelined first clock cycle,
    using a first data bus to read the current portion of the instruction set; and
    using a second data bus to read the data indicated by the previous read of the instruction set; and
  during the pipelined second clock cycle,
    using the first data bus to read the current portion of the instruction set; and
    using the second data bus to write the data indicated by the previous read of the instruction set.

12. The system of claim 9, wherein the at least one processor is further configured to:
  perform error correction during the typical operations, to generate enhanced operations for execution by the access triggered architecture;
  create a modified pipeline of the enhanced operations to reduce a second execution time of the enhanced operations, to create a modified reduced execution time; and
  execute the enhanced operations according to the modified reduced execution time, using the modified pipeline.

13. The system of claim 12, wherein the at least one processor is further configured to:
  execute the enhanced operations according to the second execution time, by:
    reading a first part of the instruction set during a first sequential clock cycle;
    performing error correction for the first part of the instruction set during a second sequential clock cycle;
    reading a second part of the instruction set during a third sequential clock cycle;
    performing error correction for the second part of the instruction set during a fourth sequential clock cycle;

reading the dataset based on the first part of the instruction set during a fifth sequential clock cycle; and writing the dataset based on the second part of the instruction set during a sixth sequential clock cycle; and execute the enhanced operations according to the modified reduced execution time, by:

simultaneously pre-fetching a future first portion of the instruction set, performing error correction for a previously pre-fetched second portion of the instruction set, and read the dataset based on a previously pre-fetched first portion of the instruction set, during a pipelined first clock cycle; and simultaneously pre-fetching a future second portion of the instruction set, performing error correction for the future first portion of the instruction set, and writing the dataset based on the previously pre-fetched second portion of the instruction set, during a pipelined second clock cycle.

14. The system of claim 12, wherein the at least one processor is configured to:

perform the error correction by including incorporating error correcting codes (ECCs) into the typical operations to verify accuracy of the instruction set; and simultaneously use the modified pipeline to perform the error correction using the ECCs, pre-fetch a future portion of the instruction set, and perform read and write operations for the dataset.

15. A non-transitory, computer-readable medium containing instructions thereon, which, when executed by a processor, perform a method for improving performance of an access triggered architecture for a computer implemented application, the method comprising:

executing typical operations of the access triggered architecture according to an execution time, wherein the typical operations comprise:

obtaining a dataset and an instruction set wherein the instruction set comprises a plurality of instructions, including a current instruction consisting of a source pointer and a destination pointer; and using the instruction set to transmit the dataset to a functional block comprising an operation, by:

retrieving the dataset from a first system memory location indicated by the source pointer;

relocating the dataset to a second system memory location of the functional block, wherein the second system memory location is indicated by the destination pointer, to trigger execution of the operation of the functional block associated with the second memory location, based on the instruction, wherein the functional block is configured to execute the operation when triggered, and wherein the functional block is triggered each time data is received at the second system memory location;

performing the operation by the functional block at the second system memory location, using the dataset, to generate a result; and returning the generated result to the second system memory location, wherein the functional block performs the operation using the dataset to generate a revised dataset comprising the generated result; and creating a pipeline of the typical operations to reduce the execution time of the typical operations, to create a reduced execution time; and executing the typical operations according to the reduced execution time, using the pipeline.

16. The non-transitory, computer-readable medium of claim 15, wherein executing the typical operations according to the execution time further comprises:

reading the instruction set during a first clock cycle and a second clock cycle;

reading the dataset based on the instruction set, during a third clock cycle; and writing the dataset based on the instruction set, during a fourth clock cycle; and wherein executing the typical operations according to the reduced execution time further comprises:

simultaneously reading a current portion of the instruction set and data indicated by a previous read of the instruction set, during a pipelined first clock cycle; and simultaneously reading the current portion of the instruction set and writing the data indicated by the previous read of the instruction set.

17. The non-transitory, computer-readable medium of claim 16, wherein executing the typical operations according to the reduced execution time, using the pipeline, further comprises:

during the pipelined first clock cycle,
using a first data bus to read the current portion of the instruction set; and
using a second data bus to read the data indicated by the previous read of the instruction set; and during the pipelined second clock cycle,
using the first data bus to read the current portion of the instruction set; and
using the second data bus to write the data indicated by the previous read of the instruction set.

18. The non-transitory, computer-readable medium of claim 15, wherein the method further comprises:

performing error correction during the typical operations, to generate enhanced operations for execution by the access triggered architecture;

creating a modified pipeline of the enhanced operations to reduce a second execution time of the enhanced operations, to create a modified reduced execution time; and executing the enhanced operations according to the modified reduced execution time, using the modified pipeline.

* * * * *